Nov. 3, 1959  A. W. PETT  2,911,153
THERMAL MIXING VALVE
Filed Nov. 4, 1957  2 Sheets-Sheet 2

Inventor
Alfred W. Pett
By Mann, Brown and McWilliams
Attys.

2,911,153
THERMAL MIXING VALVE

Alfred W. Pett, Providence, R.I.

Application November 4, 1957, Serial No. 694,372

4 Claims. (Cl. 236—12)

This invention relates to thermal mixing valves and particularly to such valves wherein the thermal power element is of the solid liquid filled type.

Thermal mixing valves are employed in a wide variety of situations, usually for mixing hot and cold water to automatically regulate the temperature of the output, and according to capacity, the required accuracy, the speed character of constancy of response required, and the relationship of power output to size the power element, different kinds of thermally responsive elements have been employed in such mixing valves.

Relatively small thermal mixing valves suitable for small capacity mixers have been manufactured and sold, but despite a general recognition that domestic shower bath or kitchen installations constitute the major potential market for thermal mixers of this kind, the sales of such devices has been largely confined to hospitals and other institutions.

In this field, the requirement for smallness in size has made it impossible to use vapor tension thermal elements, while poor response characteristics of thermally expanding plastic material has prevented successful use of such materials as the power means in such mixers.

Commercial mixing valves of this general type have, however, been produced and used wherein the power element for shifting the valve member was provided either by thermostatic bi-metal elements or by a liquid filled power element. As to those valves wherein a bi-metallic power element has been used, it has been found that the light weight bi-metal that must be used in order to attain speed of response and sufficient range of movement have so little power that improper functioning may result from any friction, scale or dirt in the valve mechanism.

As to liquid expansion power elements in shower mixers of this type, several problems have been presented which render such prior devices unsatisfactory. Thus one problem is concerned with the limitations of the liquid filled elements as to the permissible maximum stroke. These liquid filled temperature responsive power elements are usually constructed as an envelope that has cylindrical corrugated longitudinal wall that is called a Hydron or bellows, and is closed at opposite ends, and this envelope is filled with liquid such as ethyl ether, so that the envelope is expanded longitudinally in response to temperature increase. This longitudinal expansion of the bellows over the full range of operation of the mixing valve must not exceed the maximum safe limit of expansion of the bellows. This determines the movement or longitudinal dimensional change of the bellows per degree of temperature change, and thus determines the stroke of the valve per degree of temperature change. In order to supply good control operation, it is necessary to move the control valve over its full stroke with as few degrees change in the output temperature as possible, and to do this it has been the practice to design the element for a limited overall range of operation, with the result that such a bellows could be damaged by temperatures beyond this range. While this overall range exceeds the output range of the mixer, it may be below the range of the hot water supply temperature, so that the element or bellows may be damaged before the element can turn off the hot water valve. Such a situation is encountered quite frequently in practice because the normal setting of such a valve is usually above room temperature so that when the valve is not in use the thermal power element sets the valve member so as to close the cold water port and fully open the hot water port. Hence the hot water at its maximum temperature will first flow into the thermal chamber of the valve so as to tend to cause the power element to expand rapidly and far beyond the range necessary to shift the valve member to fully close the hot water port and fully open the cold water port. The normal operating range of the thermal element is, however, such that temperatures approaching boiling will tend to cause the thermal element to be expanded beyond the safe range, and under such circumstances excessive distortion is applied to the walls of the liquid filled thermal element so as to tend to cause failure thereof.

Efforts have been made to accommodate these excessive movements by the use of springs so that the thermal element may actually expand beyond its intended and safe range, and such springs are known as overrange relief springs. Such overrange relief springs have been applied in different ways, one of which employs the overrange relief spring as the reaction element for the thermally expansive element. According to another theory, the thermally expansive element is made with a solid cylindrical outer wall and corrugated and longitudinal expandable inner wall or bellows, and with an overrange relief spring located within this longitudinal expansive inner wall so that this inner wall is shortened due to the application of higher temperatures to the element. The valve operating forces are applied to the valve member through this spring, and when the valve member reaches the end of its travel, further shortening of the inner corrugated wall merely compresses the overload relief spring. This arrangement, however, also increases the range of lengthening and shortening of the corrugated wall so that this wall is weakened and the possibility of failure is increased.

In all valves of which I am aware and in which liquid filled power units are employed, it has been impossible to obtain a satisfactory fail-safe operation, and in such prior devices where the liquid charge of the power element is lost, a sudden increase in the output temperatures results, and such unsafe operation is considered to be undesirable, particularly in shower mixers.

In view of the foregoing it is the primary object to provide an improved thermal mixing valve employing a liquid filled power element wherein overrange relief is provided in such a way that the flexible walls of the power element are not moved beyond their permissible range of longitudinal distortion, and an object related to the foregoing is to provide a liquid filled thermal power element in which two longitudinally expandable walls or bellows are provided in such a way that normal operation of the valve is accomplished through longitudinal extension and contraction of one of the walls while overrange conditions are cared for by longitudinal distortion of the other one of the expandable walls.

A further object of this invention is to provide a thermal power element of the aforesaid type in which two longitudinally extensible walls or bellows are employed, one relatively large in diameter and the other relatively small in diameter, and in which the necessary valve movement is accomplished through longitudinal distortion of one of the bellows while the other of the bellows functions in adjusting the setting of the valve for the desired output temperature.

Another object of this invention is to provide a thermal power element of the solid liquid charge type which in normal operation actuates and positions the mixing valve through a fluid coupling, but which in the case of loss of charge of the element closes the hot water valve and opens the cold water valves through a direct mechanical coupling.

A further object of the invention is to provide a temperature responsive liquid filled control element that will withstand temperatures up to and including the temperature of boiling water.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

Figure 1:
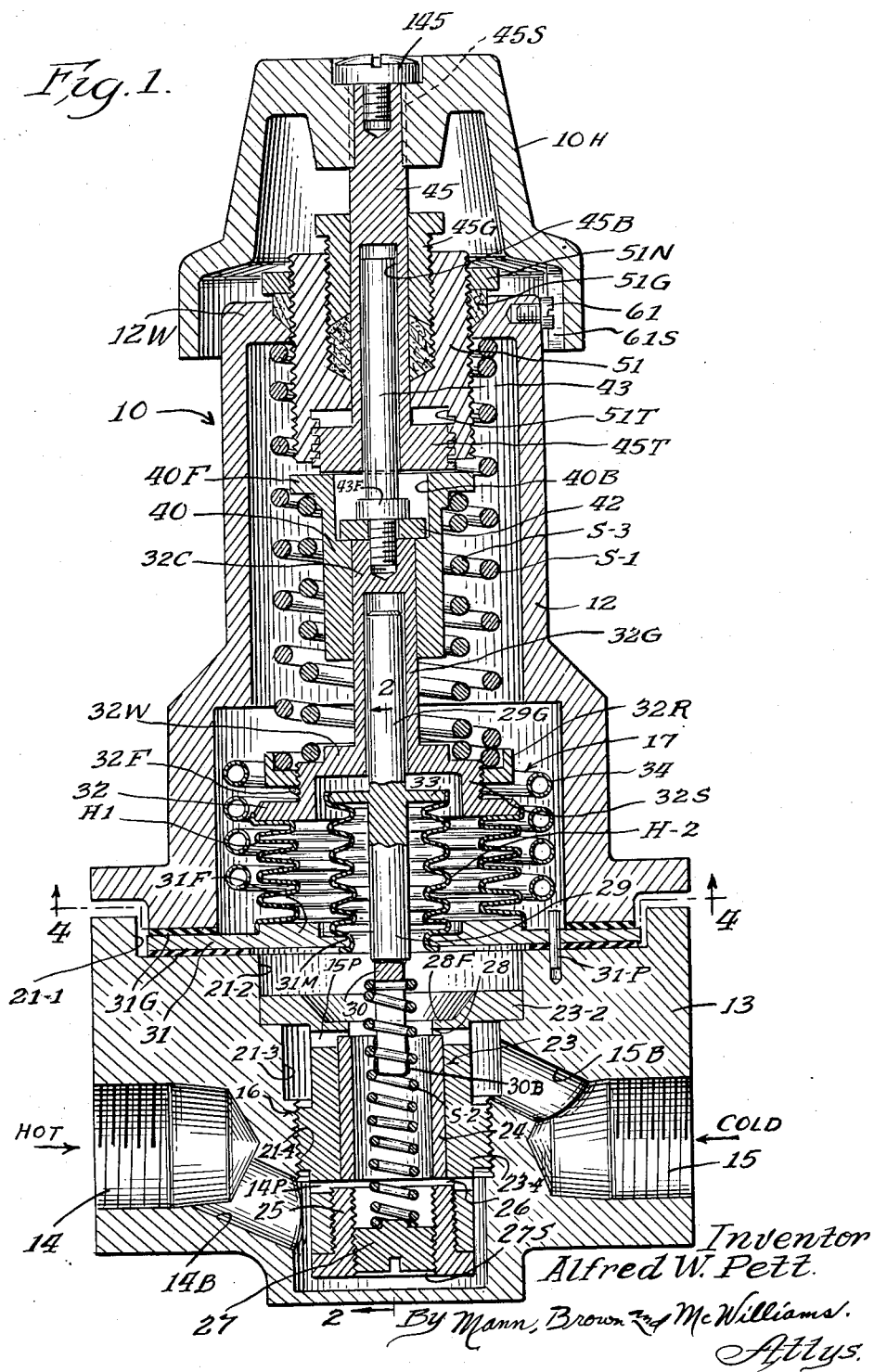
Fig. 1 is a longitudinal sectional view taken through a mixing valve embodying the features of the invention.

For purposes of disclosure the invention is herein illustrated as embodied in a thermostatic shower mixer valve 10 having a sectional casing having a housing 12 secured by bolts 12B to a base 13, and hot water and cold water supplied to the base 13 through inlets 14 and 15 respectively is proportioned by a valve assembly 16 mounted in the base 13 under control of a thermally responsive power unit 17 in the housing 12 so that the mixed output discharged from an outlet 20 of the base 13 has a predetermined temperature that is determined by the setting of the power unit 17 which is accomplished by an adjusting handle 10H at the end of the housing 12.

Figure 2:
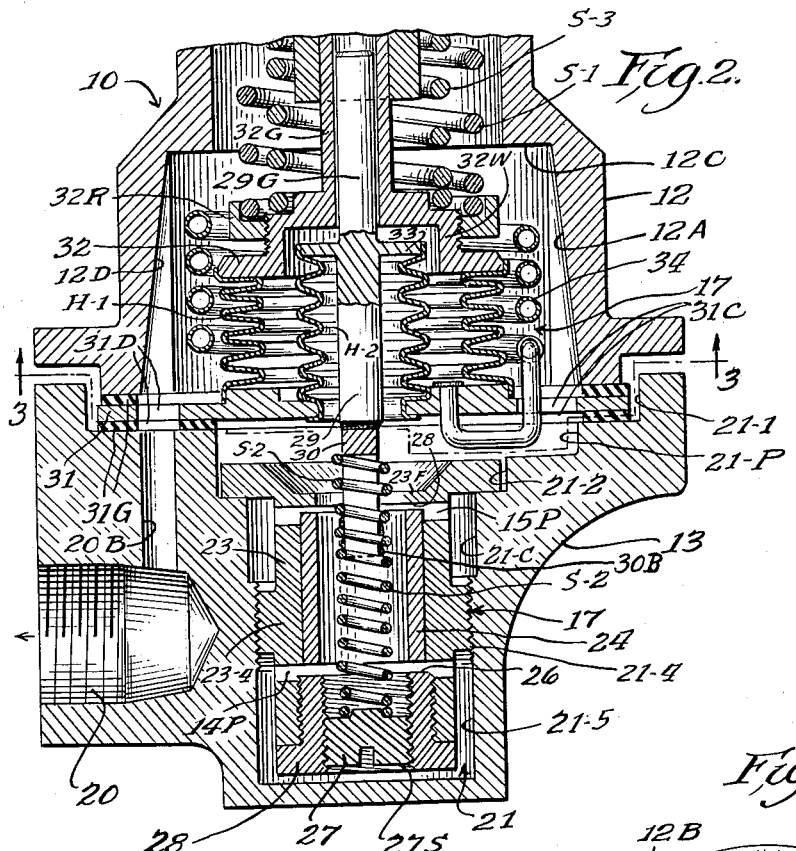
Fig. 2 is a fragmentary longitudinal section taken substantially along the line 2—2 of Fig. 1.
Figures 3, 4:
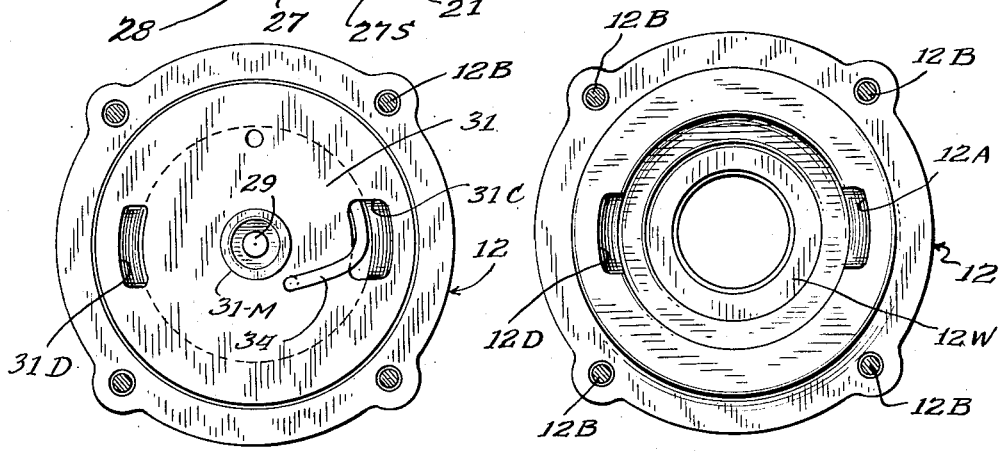
Fig. 3 is a transverse sectional view taken substantially along the line 3—3 of Fig. 2.
Fig. 4 is a transverse sectional view taken substantially along the line 4—4 of Fig. 1.

The base 13 is in the form of a casting having the hot water inlet 14 and the cold water inlet 15 entering the casting in aligned relation from opposite sides, and with the outlet 20 entering the side of the casting intermediate the two inlets, and in associating the valve assembly 16 with the inlets and the outlet, and the casting has a stepped bore 21 extended axially into its upper surface and terminating short of its lower surfaces, as shown in Figs. 1 and 2. The stepped bore 21 consists of a relatively large and shallow upper portion 21–1 that is used in mounting the thermal element 17, a somewhat smaller portion 21–2 which serves as a mixing chamber, a further and still smaller portion 21–3 that forms a part of the cold water supply path and is connected to the water inlet 15 by a bore 15B, a further reduced portion 21–4 that is internally threaded for the purpose of anchoring the valve assembly 16, and a final lower portion 21–5 that forms a part of the hot water supply path and is connected to the hot water inlet 14 by an angular bore 14B.

The valve assembly 16 includes an elongated generally cylindrical valve housing 23 that is positioned in the portions 21–2 to 21–5 of the stepped bore 21 with an intermediate outward flange 23–4 threaded into the section 21–4 of the bore to seat an outward upper flange 23–2 against the shoulder provided by the lower end of the bore portion 21–2. Below the flange 23–2 down to the anchoring flange 23–4, and below the anchoring flange 23–4, the outer diameter of the valve housing 23 is such as to be spaced from the bore sections 21–3 and 21–5.

Within the valve housing 23 a sleeve-like valve member 24 is slidably mounted for movement between a lower position wherein it engages a seat 26 provided by a flanged sleeve 25 screwed into the lower end of the valve housing 23, and an upper limit defined by a seat 28 that is provided by an inward annular flange 28F at the upper end of the valve housing 23. The flanged sleeve 25 is closed at its lower end by an adjusting plug 27 threaded into the sleeve 25, and a spring S–2 acts between the plug 27 and an upwardly projecting bail 30 fixed as by brazing 30B at the upper end of the valve member 24 to urge the valve member upwardly into engagement with the seat 28.

The lower valve seat 26 may be termed the hot water seat of the valve, and just above this seat, and below the anchoring flange 23–4, the valve housing 23 has hot water inlet passages 14P formed therethrough as by boring or slotting so that when the valve 24 is spaced from its lower or hot water seat 26, hot water may enter the valve housing 23 through the ports 14P. Similarly, cold water passages or ports 15P are formed through the valve housing 23 just below the cold water seat 28 so that when the valve member 24 is moved downwardly from its normal position, cold water may enter through the cold water ports 15P. In the automatic operation of the device, the valve member 24 is urged downwardly to the required position by a push rod 29 that engages the cross member of the bail 30, and which is connected to and operated by the thermal power unit 17, as will be described.

The thermal power unit 17 is independently assembled on a generally flat circular mounting plate or disc 31 which serves not only as a mounting means but also as a part of the envelope or enclosure for the thermally responsive liquid. In accomplishing its mounting function the disc 31 is located in the large upper end portion 21–1 of the stepped bore 21 with gaskets 31G above and below the border portions of the disc, and the disc 31, with the associated thermal power unit 17, is clamped in position by securing the housing 12 in position on the base 13.

In its functioning as a part of the expansible envelope of the thermal unit 17, the disc 31 has a relatively small central opening 31M within which the lower end of an inner bellows H2 is secured, and a low upwardly projecting annular flange 31F on the upper face of the plate 31 has the lower end of somewhat larger outer bellows H–1 fixed thereto. The upper end of the larger or outer bellows H–1 is closed by a top wall 32 of somewhat complex form, as will be explained hereinafter, while the upper end of the inner or smaller bellows H–2 is closed by a top wall 33 which as herein shown is formed as a flange on the push rod 29. The rod 29 extends downwardly through the inner bellows H–2 for contact with the bail 30 below the lower surface of the disc 31.

The thermal unit 17 as herein shown also includes a bulb 34 in the form of a spiral tube surrounding the outer bellows H–1 in spaced relation thereto and connected to the enclosed space or envelope of the unit. Thus one end of the tube is closed, while the other end is extended downwardly through matched openings 31C, Fig. 2, in the disc 31 and the lower gasket 31G and into a clearance pocket 21P formed as an outward radial extension of the portion 21–2 of the stepped bore 21. A locating pin 31P in the base 13 extends through the disc 31 and the wide lower gasket to properly locate these members and align the openings 31C with each other and with the clearance pocket 21P. The downwardly projected end of the bulb 34 is extended radially inwardly through the clearance pocket 21P and beneath the disc 31 and is then extended upwardly through the disc 31 in sealed relation as shown in Fig. 2 so as to communicate with the thermal envelope. The envelope is charged with an expansible liquid such as ethyl ether. The bulb 34 is not essential, but is preferably employed to increase the responsive rate of the unit 17 and to add effective volume to the envelope.

The portion 21-2 of the stepped bore constitutes a mixing chamber into which the hot and cold water admitted by the valve member 24 flows and is mixed, and such water advances through the lateral extension 21P and the aligned openings 31C into a temperature sensing chamber 12C that is formed within the housing 12 and which surrounds the thermal element 17. Such flow is facilitated through the provision of an angular cutout or slot 12A formed in the side wall of the chamber 12C so as to register with the openings 31C, and the water is thus distributed within the chamber 12C so that the temperature thereof may be sensed by the thermal element 17. On the opposite side of the chamber 12C, the side wall of the chamber has an angular slot 12D that is aligned with openings 31D formed in the disc 31 and the lower gasket 31G, and such openings are further aligned with a vertical bore 20B that extends to the mixed water outlet 20 of the base 13.

The inner or smaller bellows H-2 is relatively narrow in respect to the length thereof, and it is therefore guided at its upper end by an extending guide stem 29G that is formed as an extension of the rod 29. The guide stem 29G extends with a loose slidable fit into an upwardly extending guide sleeve 32G that is formed on and as a part of the top wall 32 of the larger bellows H-1. The guide sleeve 32G is closed at its upper end, as indicated at 32C, by a relatively thick wall, and the guide sleeve 32G is joined at its lower end to the wall 32 by a relatively large sleeve 32S that is screw threaded on its outer surface to receive an adjoining collar or ring 32R. At its upper end the large sleeve 32S has a thickened wall 32W about which a spring seat is provided against which one end of an overload spring S-3 bears, the collar or ring 32R also providing a spring seat against which the adjacent end of a fail-safe spring S-1 bears. The ring 32R may be adjusted by means of its threaded connection and may be fixed in adjusted position as by solder at 32F, as will be explained.

The other end of the fail-safe spring S-1 acts against the upper cross wall 12W of the housing 12, while the other end of the overrange relief spring S-3 acts against a flange 40F of an overrange relief collar 40, and the overload relief collar 40 slidably embraces the guide sleeve 32G so as to form a further element of a guiding system. The upper end portion of the overrange relief collar 40 has an enlarged bore 40B therein and this bore is of sufficient depth to provide the range of longitudinal movement necessary for overrange relief expansion of the outer bellows H-1 of the thermal unit 17. Within this enlarged bore 40B, a washer 42 is positioned against the upper end of the guide sleeve 32G, and the washer is held in position by threading the lower end of a further guide stem 43 into the wall 32C so that it extends through the washer 42 and a flange 43F on the stem 43 clamps the washer 42 in position.

The guide stem 43 is arranged to have a loose guiding fit in an axial bore 45B in an adjusting stem 45 to which the handle 10H is connected by means of splines 45S and a screw 145. The stem 45 is rotatably mounted in an adjustable bearing sleeve 51 that is threaded through the cross wall 12W of the housing and is sealed by means of a gland 51G and a nut 51N. The longitudinal setting of the bearing 51 may be established at the factory so as to establish the maximum temperature setting of the valve or mixer. The lower end of the sleeve 51 has an upwardly extended threaded bore 51T for cooperation with a threading head 45T that is formed in the lower end of the stem 45, and this threading is relatively coarse so that the stem 45 may be adjusted longitudinally to attain the desired temperature adjustment, as will be described. The stem 45 is of course rotatable in the sleeve 51 and a packing gland 45G is employed to seal this rotative mounting. The lower end of the threaded head 45T acts as a settable abutment against which the upper end of the overrange or overload collar 40 may bear, and by rotative adjustment of the handle 10H this head 45T may locate the collar 40 to establish the output temperature that is to be attained.

As above pointed out the maximum output temperature is determined by the longitudinal setting of the threaded sleeve 51, and if desired, a minimum low temperature may be established by limiting the rotative movement of the handle 10H. In this instance a screw 61 is extended into the side of the housing 12 in position to be engaged by a rib or stop 61S formed within the handle 10H, as shown in Fig. 1.

To illustrate the operation of the mixer in a general way, it will be assumed that the mixer is in use with the valve member 24 located about midway between the seats 26 and 28. The overload collar 40 is in contact with the head 45T of the adjustable stem 45 which serves as a stationary reaction member for the overrange spring S-3. If it is desired to reduce the output temperature, this is done by rotative adjustment of the handle 10H to move the overrange collar 40 downwardly which compresses the bellows H-1 which in turn compresses bellows H-2, moving the valve 24 toward hot water seat 26. Until the valve member 24 contacts the seat 26, the normal loaded force in spring S-3, plus the spring S-1, and plus the force required to compress or extend bellows H-1, is greater than the force required through the fluid coupling to close the hot water port. When the valve 24 contacts the seat 26, further movement of bellows H-1 ceases and additional movement of the collar 40 results in compression of the spring S-3. As the output temperature decreases, the volume of the charge decreases, and the overrange collar 40 returns to its normal position against washer 42. Further decrease in the temperature of the output water further decreases the volume of the charge, permitting bellows H-2 to expand and open the hot water port and close the cold water port until the desired temperature is reached.

Further valve movement then takes place only in response to further adjustment of the handle 10H or temperature changes in the input.

With the addition of the fail safe spring S-1 to a liquid filled thermal expansion system it is necessary to design the system to assure its performance throughout the operating range. The forces involved in the operation may be determined by the following mathematical analysis:

Let:

$EA1$ = effective area of bellows H1.
$EA2$ = effective area of bellows H2.
$F1$ = the sum of the forces applied by the compression of spring S1, the compression or extension of bellows H1, and the force applied to the head 45T.
$F2$ = the sum of the forces applied by the compresison of spring S2 and the compression or extension of bellows H2.
$P$ = the pressure in pounds per square inch in the fluid charge in thermal element 17.

Now: $$P = F1/EA1 \qquad (1)$$

When both the hot and cold water ports are open so that the valve is mixing the two waters:

$$F2 = (EA2/EA1) \times F1$$

When the cold water port is closed:

$$F2 > (EA2/EA1) \times F1 \qquad (2)$$

The plug 27 is adjusted so that this condition is met at the maximum operating temperature and soldered or otherwise permanently locked in this position as shown at 27S, Fig. 1.

When the hot water port is closed:

$$F2 < (EA2 \times EA1) \times F1 \quad (3)$$

At the minimum operating temperature the thermal element 17 is minimum in size, and the sum of the force from spring S1 and the force from the compression or extension of bellows H-1 is minimum. The force from the compression of spring S3 with the collar 40 against washer 42 must be sufficient so that Equation 3 is met. This determines the minimum design value for spring S3.

If the mixer 10 is set for minimum temperature and subjected to the maximum temperature the force F1 is maximum. That is, the thermal element 17 is maximum in size so that the sum of the forces from the compression spring S1 and the compression or extension of bellows H1 is maximum and spring S3 is compressed beyond the force when overload collar 40 is in contact with washer 42 and the collar 40 moves down on extension 29G for the maximum possible force from spring S3. It follows from Equation 1 that the internal pressure is maximum at this point and by design this pressure must be within the operating pressure range for both bellows.

In case a leak occurs so that the fluid charge in thermal element 17 is lost, the spring S1 compresses bellows H1 until contact is made between disc 32 and cap 33, and further movement of disc 32 moves stem 29 to move the valve member 24 until contact is made with the hot water seat 26 to shut off the hot water port and open the cold water port.

Let:

$F3$ = force from compression of spring S1.
$F4$ = force from compression or extension of bellows H1. (Actually a Fail-Safe, H1 will be in compression and F4 will be positive.)

And at Fail-Safe:

$$F3 > F4 + F2 \quad (4)$$

The ring 32R is adjusted and permanently locked in position by solder or other means as shown at 32F, Fig. 1, at the factory so that Equation 4 is met.

From the foregoing description it will be apparent that the present invention provides an improved thermal mixer in which a liquid filled thermal unit may be operated at all times within the safe limits of distortion of the bellows that are used in the thermal unit, and it will also be apparent that the present invention utilizes the bellows that form the thermal unit in such a way that one of the bellows is effective in the normal operation of the unit, while the other of the bellows is utilized only in the adjustment and in the overrange action of the thermal unit.

It will also be apparent that the present invention provides for the attainment of fail-safe operation in mixers that are operated by liquid filled thermal units.

Thus while I have illustrated and described a preferred embodiment of my invention it is to be understood that changes and variations may be made by those skilled in the art without departing from the spirit and scope of the appending claims.

I claim:

1. A water mixing valve comprising a valve mechanism proportioning the amounts of hot and cold water flow, a thermal element consisting of an envelope solidly charged with an expansible liquid and formed in part by two bellows, one relatively large in relation to the other, means to operate the valve mechanism in relation to the movement of the smaller of the two bellows, means to adjustably limit the movement of the larger of the two bellows with means to resiliently permit further movement of the larger bellows beyond a predetermined load, a spring load against the larger bellows to apply against the small bellows through liquid coupling a force proportional to the ratio of the effective areas of the two bellows as long as the element is charged, and means effective on loss of charge to apply such force against the large bellows and through mechanical coupling against the smaller bellows to shut off the flow of the hot water.

2. A temperature control device comprising means to increase or decrease the heat units supplied to the media under control, a thermal element consisting of an envelope solidly charged with an expansible liquid and formed in part by two bellows, one relatively large in relation to the other, means to operate the means used to control the supply of heat units in relation to the movement of the smaller bellows, means to adjustably limit the movement of the larger bellows with means to resiliently permit further movement of the larger bellows beyond a predetermined load, a spring load against the larger bellows to apply against the smaller bellows, through liquid coupling a force proportional to the ratio of the effective areas as long as the element is charged, and means effective on loss of the liquid charge for the larger bellows to apply the force through mechanical coupling to the smaller bellows to shut off the supply of heat units.

3. In a constant temperature mixing valve for fluids of different temperatures, a valve casing having hot and cold liquid inlets and a mixing chamber to which liquid may flow from said inlets and having an outlet from said chamber for fluid mixture, valve means controlling liquid flow through said inlets and movable between a hot position wherein said hot liquid inlet is fully open and said cold liquid inlet is fully closed and a cold position wherein said cold liquid inlet is fully open and said hot liquid inlet is fully closed, a liquid filled thermal power unit mounted in said mixing chamber and comprising a mounting plate having a large bellows and a small bellows disposed one inside the other and sealed at one end to said plate and having closure walls at their other ends to define the liquid-containing enclosure, said closure wall of the large bellows, in shortening of the large bellows in response to loss of the liquid charge, being operatively engageable with the closure wall of the smaller bellows to mechanically shorten said smaller bellows, spring means urging said valve means to its hot position, a rigid push rod disposed within said smaller bellows and fixed to the closure wall thereof for engagement with said valve means to shift the same toward its cold position when said smaller bellows is shortened, a fail safe spring mounted in said chamber and acting on the closure wall of said large bellows to shorten the large bellows and then the small bellows and thereby shift said valve means to its closed position upon loss of charge of the unit, an adjustable abutment in said chamber spaced from and in opposing relation to the closure wall of the large bellows, and an over-range spring disposed to act between said abutment and the closure wall of the large bellows for establishing the output temperature in response to the setting of said adjustable abutment and for compression during over-range expansion of said unit.

4. In a constant temperature mixing valve for fluids of different temperatures, a valve casing having hot and cold liquid inlets and a mixing chamber to which liquid may flow from said inlets and having an outlet from said chamber for the fluid mixture, valve means controlling liquid flow through said inlets and movable between a hot position wherein said hot liquid inlet is fully open and said cold liquid inlet is fully closed and a cold position where said cold liquid inlet is fully open and said hot liquid inlet is fully closed, a liquid filled thermal power unit mounted in said mixing chamber and defined in part by a large bellows arranged to be extended by expansion of the liquid charge and in part by a small bellows arranged to be shortened by expansion of the liquid charge, spring means urging said valve means to its hot position, a rigid push rod operated by said smaller bellows to shift said valve means toward its cold position when said smaller bellows is shortened, a fail safe spring within said chamber acting on said large bellows tending to shorten said larger bellows, temperature adjusting abutment within said chamber, an over-range spring within said chamber to act between said abutment and said large bellows for compression during over-range operation and to variably establish the operating volume of the power unit in accordance with the setting of said abutment, and means operable by said fail safe spring upon loss of the liquid charge of said unit to shift said valve means to said cold position.

References Cited in the file of this patent

UNITED STATES PATENTS

| | | |
|---|---|---|
| 1,661,346 | Sawyer | Mar. 6, 1928 |
| 2,205,334 | Barnes | June 18, 1940 |
| 2,335,761 | Hultman | Nov. 30, 1943 |
| 2,387,793 | Holmes | Oct. 30, 1945 |
| 2,548,516 | Cantalupo | Apr. 10, 1951 |
| 2,672,157 | Branson | Mar. 16, 1954 |